(12) United States Patent
Denk

(10) Patent No.: US 7,426,528 B2
(45) Date of Patent: Sep. 16, 2008

(54) METHOD AND DEVICE FOR CALCULATING AN ITERATED STATE FOR A FEEDBACK SHIFT REGISTER ARRANGEMENT

(75) Inventor: Robert Denk, Grafing (DE)

(73) Assignee: Infineon Technologies AG (DE)

( * ) Notice: Subject to any disclaimer, the term of this patent is extended or adjusted under 35 U.S.C. 154(b) by 723 days.

(21) Appl. No.: 10/962,789

(22) Filed: Oct. 12, 2004

(65) Prior Publication Data

US 2005/0047527 A1 Mar. 3, 2005

Related U.S. Application Data

(63) Continuation of application No. PCT/DE03/00963, filed on Mar. 24, 2003.

(30) Foreign Application Priority Data

Apr. 12, 2002 (DE) .............................. 102 16 240

(51) Int. Cl.
*G06F 1/02* (2006.01)
(52) U.S. Cl. .................................................... 708/252
(58) Field of Classification Search ................. 708/252, 708/492
See application file for complete search history.

(56) References Cited

U.S. PATENT DOCUMENTS

| 5,926,070 | A | * | 7/1999 | Barron et al. | ................. 331/78 |
| 6,005,888 | A |   | 12/1999 | Barron |   |
| 6,038,577 | A |   | 3/2000 | Burshtein |   |
| 6,173,009 | B1 | * | 1/2001 | Gu | .............................. 375/150 |
| 6,339,781 | B1 | * | 1/2002 | Sasaki | ......................... 708/252 |
| 6,647,054 | B1 | * | 11/2003 | Greenhoe | .................... 375/140 |

FOREIGN PATENT DOCUMENTS

| DE | 196 35 110 A1 | 4/1997 |
| DE | 693 26 681 T2 | 2/2000 |
| WO | WO 03/028239 A1 | 4/2003 |

OTHER PUBLICATIONS

"Universal Mobile Telecommunications system (UMTS); Spreading and Modulation (FDD) (#GPP TS 25.213 version 4.2.0 Release 4)" pp. 1-27.

* cited by examiner

*Primary Examiner*—Chuong D Ngo
(74) *Attorney, Agent, or Firm*—Dickstein, Shapiro, LLP.

(57) ABSTRACT

A final state in a shift register arrangement is obtained from an initial state by means of N-fold iteration using an iteration rule prescribed by a characteristic polynomial f(x) of n-th order. To determine the final state, a tap mask which is characteristic of N' shift register operations is calculated. Using the tap mask, n shift register operations are performed. This produces the n bits of an N'-fold iterated state of the shift register arrangement. Any remaining N-N' iterations which are needed are performed in another manner.

24 Claims, 3 Drawing Sheets

METHOD AND DEVICE FOR CALCULATING AN ITERATED STATE FOR A FEEDBACK SHIFT REGISTER ARRANGEMENT

CROSS REFERENCE TO RELATED APPLICATION

This application is a continuation of copending International Application No. PCT/DE03/00963 filed Mar. 24, 2003 which designates the United States, and claims priority to German application no. 102 16 240.9 filed Apr. 12, 2002.

TECHNICAL FIELD OF THE INVENTION

The present invention relates to a method and a device for determining a final state, comprising n bits and iterated N times, for a shift register arrangement from a given initial state, comprising n bits, for the shift register arrangement. The invention also relates to the generation of pseudo noise sequences shifted through N bits, which are used particularly as spreading sequences in CDMA-based mobile radio systems (CDMA: Code Division Multiple Access).

BACKGROUND OF THE INVENTION

In a CDMA mobile radio system, spreading sequences are used in order to be able to distinguish between different cells and subscribers in the mobile radio network. For this purpose, each user and each logical channel is assigned a different sequence of the values −1 and 1. The signal assigned to the individual user can thus be received, separated from the other signals and reconstructed. This is referred to as Code Division Multiple Access (CDMA). Important CDMA transmission systems are the IS-95 system used in the USA and the UMTS system, which is specified in 3rd Generation Partnership Project (3GPP). The detailed description of the coding used for UMTS can be found in "3GPP: Spreading and modulation (FDD)", 3rd Generation Partnership Project TS 25.213 V4.2.0 (2001-12).

All the spreading codes which are used can be traced back to sequences of the binary values 0 and 1. These sequences may, by way of example, be "pseudo noise sequences", which are identified by defined autocorrelation and cross-correlation characteristics.

While a pseudo noise sequence is represented in the theoretical representation as a sequence of binary values 0 and 1, the spreading sequence which is actually used is a sequence of the values +1 and −1. The binary value 0 respectively becomes the value +1 in the actual spreading sequence.

Pseudo noise sequences are defined by an iteration rule, with the iteration being carried out in the field GF(2), that is to say in the number field with the two elements 0 and 1. The theoretical basis of pseudo noise sequences and of the defining iteration rule is the theory of irreducible primitive polynomials over the field GF(2). A description of this theory and its application in the mobile radio field can be found, by way of example, in "CDMA Systems Engineering Handbook" by J. S. Lee, L. E. Miller, Artech House, Boston/London, 1998, particularly in chapter 6 therein.

Every individual pseudo noise sequence is uniquely defined by the initialization state of the code generator, that is to say by the first values of the sequence, and by the polynomial which is used for the iteration. In this case, the polynomial and hence the iteration rule in mobile radio applications are either defined for the entire network or else only a small number of different polynomials are used overall, as is the case, by way of example, for the definition of the "scrambling codes" in UMTS systems. The initialization state (i.e. the contents of the shift register, operating as code generator, at the start of code generation), on the other hand, is different for each individual pseudo noise sequence.

These first values of the sequence and hence the initialization state of the registers in the code generator may be unknown for various reasons. An unknown initialization state arises when the coding is intended to be started at a different time than the signal transmission itself. This situation occurs in the "compressed mode" in UMTS; further information relating to this mode can be found in "3GPP: Physical channels and mapping of transport channels onto physical channels (FDD)", 3rd Generation Partnership Project TS 25.211, Release 1999.

The start of the sequence and hence the initialization state of the registers is also unknown when the code number does not directly define the register contents in the initialization state but, instead of this, defines a shift through a certain number of bits in the pseudo noise sequence used. By way of example, in UMTS the code for the number N is defined, in accordance with the 3GPP standard, as an N-bit shift in a firmly prescribed pseudo noise sequence. Further information relating to the relationship between the code number and the associated pseudo noise sequence can be found in "3GPP: Spreading and modulation (FDD)", 3rd Generation Partnership Project TS 25.213, V4.2.0 (2001-12), specifically in section 5.2, in particular.

To be able to start the code generator, it is thus necessary in both cases to calculate the initialization state of the shift register first. When the code generator's shift register has been initialized with the initial values of the sequence being sought, the other sequence values can be produced without difficulty by means of simple register operations in the subsequent normal mode.

The first way of calculating the initialization state of the shift register is to start the sequence at the original start time and then to iterate it N times. In this way, the desired sequence shifted through N bits can be obtained. Only then is the output from the shift register used as code.

This solution is practiced in previous systems from the prior art, i.e. before outputting the desired pseudo noise sequence the register content of the shift register structure is iterated N times, and the process of outputting the actual pseudo noise sequence shifted through N bits is not started until after these prior iterations, which set the initialization state, have been carried out. One disadvantage of this procedure is that the number of operations required is proportional to the magnitude of the desired shift N. This variability makes it more difficult to control the overall time sequence. A further disadvantage is that the computational complexity and amount of time required become very large when the desired shift N has large values. During the mobile station's reception mode in UMTS systems, offsets in the range between N=0 and N=262 142 arise. Since the generation of the desired pseudo noise sequence has to wait until the desired offset is reached, this means an unacceptable delay in transmission and reception.

One alternative option is to store, for each desired shift N, the associated contents of the shift register in the initialization state in a table (ROM: Read Only Memory). This sets the shift register's lead time virtually to zero. The disadvantage is that a large memory area needs to be used.

SUMMARY OF THE INVENTION

It is therefore an object of the invention to calculate the final state, iterated N times, or the pseudo noise sequence, shifted through N bits, for a given initial state of a shift register arrangement with as little complexity as possible. In particular, the aim is to be able to achieve an appropriate compromise between memory requirement and computation time.

This object of the invention can be achieved by a method for determining a final state, comprising n bits and iterated N times, by a device for determining a final state, comprising n bits and iterated N times, and by the use of this device for producing a spreading sequence.

In the inventive method for determining a final state, comprising n bits and iterated N times, for a shift register arrangement from a given initial state, comprising n bits, for the shift register arrangement, the iteration rule is given by the characteristic polynomial $$f(x)=1+c_1 \cdot x + c_2 \cdot x^2 + \ldots + c_{n-1} \cdot x^{n-1} + x^n$$

with $c_1, c_2, \ldots, c_{n-1} \in \{0; 1\}$. In line with the invention a shift register arrangement state change which corresponds to a number N' of shift register operations, where $0 < N' \leq N$, is calculated by the following steps: a tap mask which is characteristic of N' shift register operations is determined, and n shift register operations are performed, with the tap mask being used to obtain the n bits of an N'-fold iterated state of the shift register arrangement.

The invention is thus based on the insight that a state, developed further by N' iterations, for the shift register arrangement can be calculated or generated by determining a suitable tap mask for the shift register arrangement and subsequently performing n shift register operations. If N=N', which is particularly preferable, then the final state sought is obtained, from the initial state, almost entirely (apart from the remaining n shift register operations) through the explicit calculation of the tap mask for N. In comparison with the prior art, in which the final state is obtained through N-fold iteration of the shift register arrangement, the advantage of the invention is that it is possible to determine the tap mask in a much shorter time than carrying out N prior iterations (it is pointed out that N is very large in many fields of application).

This advantage is fundamentally retained when N'<N, i.e. a state change in the shift register arrangement for just a share N' of the required N iterations is calculated by calculating the associated tap mask and subsequently carrying out n shift register operations. The remaining N-N' iterations of the shift register arrangement can then be carried out before or after or both partly before and partly after the inventive calculation of an N'-fold iterated shift register state—e.g. in the form of direct shift register operations or in another manner.

A further advantage is that the tap mask can be determined by a processor, whereas the N prior iterations in the prior art imperatively need to be carried out in hardware, i.e. by a real shift register, for reasons of time. In comparison with the aforementioned alternative practice, which involves all final states of the shift register arrangement being stored in a table, the invention permits a significant saving of memory space.

It is pointed out that in the vernacular of the present document the term "shift register arrangement" merely signifies the functionality of a feedback shift register and does not imply the presence of a real shift register. A shift register arrangement may thus be implemented, by way of example, in the form of a processor which executes a suitable piece of software. A real ("hardwired") shift register is referred to as a "shift register" in this document, in line with the usual vernacular.

The tap mask is preferably defined by the polynomial $$m(x) = [x^{N'}] \bmod f$$

in the form $$m(x) = m_0 + m_1 \cdot x + m_2 \cdot x^2 + \ldots + m_{n-1} \cdot x^{n-1}$$

with the coefficient set $m_0, m_1, \ldots, m_{n-1} \in \{0; 1\}$ and the computation rule that the i-th cell of the shift register arrangement is tapped off at the precise instant when $m_i=1$, and that for each shift register operation a modulo two addition is performed for the bits which have been tapped off. In this case, one preferred method variant is characterized in that the step of determining the tap mask comprises the following steps: N is split into a sum comprising k whole numbers $N_i$, where k>1, in line with $$N = \sum_{i=1}^{k} N_i,$$

and, if N'=N, the tap mask which is characteristic of N shift register operations is determined from the tap masks which are characteristic of the $N_i$, $i=1, \ldots, k$, shift register operations on the basis of $$m(x) = \prod_{i=1}^{k} m_i(x) \bmod f, \quad \text{where}$$

$$m_i(x) = [x^{N_i}] \bmod f.$$

If N'<N, then those summands $N_{i(j)}$ for which $$N' = \sum_{j=1}^{k'} N_{i(j)},$$

where k'<k, need to be selected from all the summands $N_i$. Next, the tap mask which is characteristic of N' shift register operations is calculated from the tap masks which are characteristic of the $N_{i(j)}$, $j=1, \ldots, k'$, shift register operations on the basis of $$m(x) = \prod_{j=1}^{k'} m_{i(j)}(x) \bmod f, \quad \text{where} \quad m_{i(j)}(x) = [x^{N_{i(j)}}] \bmod f.$$

Splitting therefore allows the tap mask m(x) sought to be calculated from a limited number of previously calculated tap masks $m_i(x)$ using a simple computation operation (polynomial multiplication). This measure makes it possible to use the choice of splitting basis to define the compromise between memory space requirement (for storing the previously calculated tap masks $m_i(x)$) and computation complexity (for ascertaining m(x) on the basis of the tap masks $m_i(x)$ using polynomial multiplication) as desired. This degree of freedom, which is to choose a suitable splitting basis, allows the inventive method to be aligned with a wide variety of hardware/software prerequisites.

Expediently, the coefficient sets of the polynomials $m_i(x)$ for the splitting basis are stored in a memory. In this case, the method preferably comprises the step of reading the coefficient sets of the polynomials $m_{i(j)}(x)$ for the split $$N' = \sum_{j=1}^{k'} N_{i(j)}$$

(which for N'=N correspond to the coefficient sets of the polynomials $m_i(x)$ for the split $$N = \sum_{i=1}^{k'} N_i)$$

from the memory.

Preferably, the final state, comprising n bits and iterated N times, is used as initialization state for generating a pseudo noise sequence shifted through N bits. Pseudo noise sequence refers to a sequence of binary values which is produced by a feedback shift register arrangement described by an irreducible polynomial. As already explained, a pseudo noise sequence is defined firstly by the initialization state of the shift register arrangement and secondly by the characteristic polynomial of the shift register arrangement. If the N-fold iterated final state calculated using the inventive method is used as initialization state for generating a pseudo noise sequence, then this means that the pseudo noise sequence can be started immediately at the desired position shifted through N bits. Starting from the initialization state, the further sequence values are then delivered by shift register operations.

In this respect, one advantageous measure of the inventive method is characterized in that the step of calculating the iterated final state is followed by this final state being written as initialization state into a ("real") shift register, comprising n shift register cells, with external function circuitry defined by the characteristic polynomial f(x). This shift register then forms the code generator or a component thereof.

The n shift register operations for calculating the iterated final state (step b) can be carried out either by a processor, or it is possible to use a shift register, particularly the shift register in the code generator, for this purpose. In the latter case, the shift register is also provided with tap circuitry which can be controlled by the tap mask, and this tap circuitry is used to obtain the n bits of the N'-fold iterated state, which then—possibly after the remaining N-N' iterations have been carried out—form the initialization state of the code generator. In this case, the shift register in the code generator uses the tap mask to produce its own initialization state.

The inventive device for determining a final state, comprising n bits and iterated N times, for a shift register arrangement from a given initial state, comprising n bits, for the shift register arrangement comprises a means for determining a tap mask which is characteristic of N' shift register operations in this shift register arrangement, where N' is a whole number and 0<N'≦N, and a means for performing n shift register operations, where the tap mask is used to obtain the n bits of an N'-fold iterated state of the shift register arrangement. If N'=N, then, as already mentioned, the final state of the shift register arrangement is generated directly from the initial state, advantageously without needing to perform any further iterations.

It is also particularly advantageous if the device comprises a memory which stores the coefficient sets for a plurality of tap masks, which are characteristic of $N_i$ shift register operations, for the characteristic polynomials $m_i(x)$, where $m_i(x)=[x^{N_i}]$mod f. In this case, it is possible to obtain the sought tap mask m(x) by combining memory access operations and computation steps in optimum fashion while taking into account the limitations for memory size and computation complexity.

One particularly preferred configuration of the invention is characterized in that both the means for determining a tap mask which is characteristic of N' shift register operations in the shift register arrangement and the means for performing n shift register operations using the tap mask are produced in the form of a processor. In this case, all computation steps in the inventive method (i.e. all steps for calculating the final state of the shift register arrangement) are executed by the processor. A feedback shift register is necessary only when the calculated final state is intended to be used as initialization state for generating a pseudo noise sequence, i.e. when a code generator implemented in hardware is used.

A further, likewise preferred option is for the means for determining a tap mask which is characteristic of N' shift register operations in the shift register arrangement to be produced in the form of a processor, and for the means for performing n shift register operations using the tap mask to be produced in the form of a shift register, comprising n shift register cells, with external function circuitry defined by the characteristic polynomial f(x) and tap circuitry which can be controlled by the calculated tap mask. In this case, the n shift register operations are thus provided by a real shift register implemented in hardware. When a pseudo noise code is being generated, such a shift register with function circuitry is already present (as a code generator), which means that the addition of tap circuitry implementing the tap mask allows the shift register in the code generator to be jointly used for carrying out the n shift register operations in order to determine the final state (which is then used as initialization state for code generation).

BRIEF DESCRIPTION OF THE DRAWING

The invention is described in more detail below using a plurality of exemplary embodiments illustrated in the drawing, in which.

DETAILED DESCRIPTION OF THE INVENTION

Figure 1:
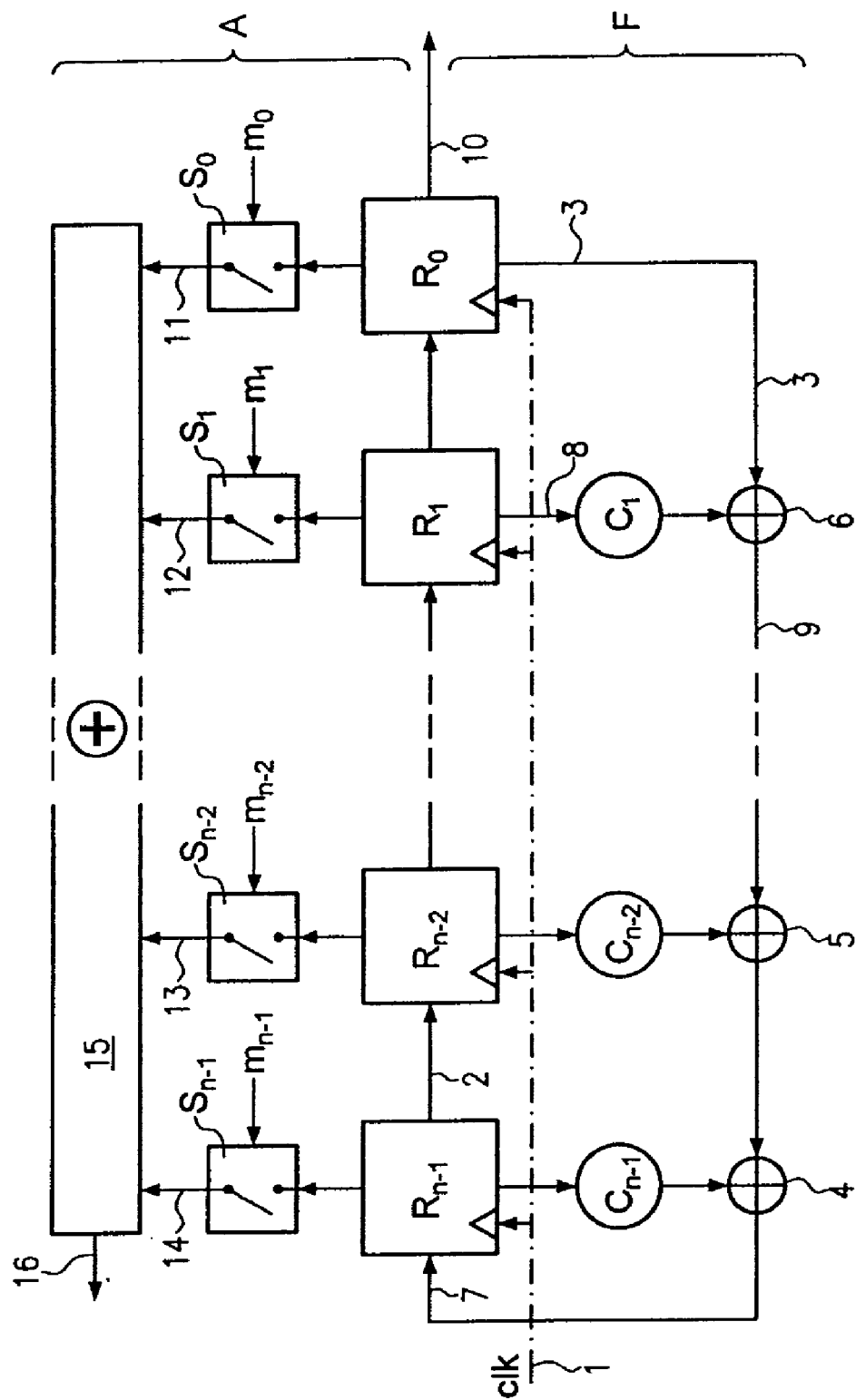
FIG. 1 shows a circuit diagram for a feedback shift register with tap circuitry.

FIG. 1 shows the structure of a shift register with two pieces of external circuitry (function circuitry F and tap circuitry A). The shift register comprises n register cells $R_0$, $R_1$, ..., $R_{n-2}$, $R_{n-1}$, with the register content of a cell respectively being able to assume the value 0 or 1. The common clock line 1 is used to supply clock pulses clk to the register cells. With each clock pulse, the content of a register cell with index i (i=1, 2, ..., n−1) is transferred to the register cell with index i−1. To this end, the output of a register cell is respectively connected to the input of the register cell with the next smallest index. By way of example, the output of the register cell $R_{n-1}$ is connected to the input of the register cell $R_{n-2}$ via the signal line 2. This makes it possible for the bit sequence which is present at the start to be shifted one register cell or one bit position to the right with every clock pulse clk.

First of all, the function circuitry F will be explained. The signal 3 which can be tapped off at the register cell $R_0$ is modified by a number of XOR gates 4, 5, 6 in order to obtain the signal 7 which is applied to the input of the first register cell $R_{n-1}$. The way in which the signal 3, which can be tapped off at the cell $R_0$, is modified in order to obtain the feedback signal 7 is defined by the coefficients $c_1, \ldots, c_{n-2}, c_{n-1}$, which may each assume the value 0 or 1. When $c_i$ has the value 0, this means that the signal which can be tapped off at the output of the register cell $R_i$ has no kind of influence on the feedback signal 7. When $c_1=0$, for example, the signal 3 is not modified by the signal 8 which can be tapped off at the register cell $R_1$. The signal 3 applied to the first input of the XOR gate 6 is routed unchanged to the output of the XOR gate 6, which means that the signal 9 corresponds to the signal 3. When the coefficient $c_1=0$, the XOR gate 6 may therefore also be omitted and can be replaced with a direct connection between the signal 3 and the signal 9.

When a coefficient $c_i$ (where $i=1, 2, \ldots, n-1$) is equal to 1, on the other hand, the signal which can be tapped off at the register cell $R_i$ contributes to the feedback signal 7. When $c_1=1$, for example, the signal 8 is XORed with the signal 3 which can be tapped off at the register cell $R_0$ in the XOR gate 6, so that the modified signal 9 is obtained. Since an XOR function can be described as modulo two addition, the XOR gates 4, 5 and 6 are shown as modulo two adders in FIG. 1.

The recursion rule for a shift register with function circuitry of the type shown in FIG. 1 is prescribed by a characteristic polynomial in the form $$f(x) = 1 + c_1 \cdot x + c_2 \cdot x^2 + \ldots + c_{n-1} \cdot x^{n-1} + x^n,$$

where the coefficients $c_1, c_2, \ldots, c_{n-1}$ correspond to the coefficients shown in FIG. 1 and, in this respect, they assume the value 0 or 1. In the area of coding or decoding signals, the polynomials $f(x)$ used are irreducible polynomials. Irreducible polynomials are characterized in that they cannot be represented as the product of at least two factors which, for their part, are also polynomials with a degree of greater than 0 over the field $GF(2)$. Irreducible polynomials therefore cannot be factorized into polynomials of a lower degree.

At the time 0, the initial values of the register cells $R_0, R_1, \ldots, R_{n-1}$ shall be $x_0(0), x_1(0), \ldots, x_{n-1}(0)$. The values $x_0(t+1), x_1(t+1), \ldots, x_{n-1}(t+1)$ of the registers at the time $t+1$ can each be derived from the values of the registers $x_0(t), x_1(t), \ldots, x_{n-1}(t)$ at the time $t$ using the following recursion rule:

$$\begin{aligned}
x_0(t+1) &= x_1(t), \\
x_1(t+1) &= x_2(t), \\
&\vdots \\
x_{n-2}(t+1) &= x_{n-1}(t), \\
x_{n-1}(t+1) &= x_0(t) + c_1 \cdot x_1(t) + c_2 \cdot x_2(t) + \ldots + c_{n-1} \cdot x_{n-1}(t)
\end{aligned}$$

The addition used in this case is a modulo two addition, as mentioned, that is to say an XOR operation. If $f(x)$ is an irreducible polynomial, then the signal which can be tapped off at the output 10 of the shift register is a "pseudo noise sequence"

$$x_0(0), x_0(1), x_0(2), x_0(3), \ldots$$

(corresponds to the signal 3). With every clock pulse clk on the clock line 1, a new sequence value appears at the output 10 of the shift register.

The pseudo noise sequences which can be generated using the hardware shown in FIG. 1 have suitable correlation characteristics for the signal coding. In CDMA methods such as UMTS or IS-95, such pseudo noise sequences are therefore used to produce spreading sequences at the sender and receiver ends (this is explained in more detail in FIG. 2 using a specific example). The shift register structure shown in FIG. 1 therefore represents a suitable piece of hardware for producing spreading sequences in mobile stations and base stations which use a CDMA method as transmission standard.

The register vector $$\begin{pmatrix} x_0(t) \\ x_1(t) \\ \vdots \\ x_{n-2}(t) \\ x_{n-1}(t) \end{pmatrix}$$

represents the content of the register cells $R_0, R_1, \ldots, R_{n-1}$ at the time t. If the $n \times n$ matrix T is defined as $$T = \begin{pmatrix} 0 & 1 & 0 & \cdots & 0 & 0 \\ 0 & 0 & 1 & & & 0 \\ \vdots & & & \ddots & & \vdots \\ & & & & 1 & 0 \\ 0 & & & & 0 & 1 \\ 1 & c_1 & c_2 & \cdots & c_{n-2} & c_{n-1} \end{pmatrix},$$

then the recursion rule can be expressed as follows:

$$\begin{pmatrix} x_0(t+1) \\ x_1(t+1) \\ \vdots \\ x_{n-2}(t+1) \\ x_{n-1}(t+1) \end{pmatrix} = T \cdot \begin{pmatrix} x_0(t) \\ x_1(t) \\ \vdots \\ x_{n-2}(t) \\ x_{n-1}(t) \end{pmatrix}.$$

The $n \times n$ matrix T is also referred to as characteristic matrix for the recursion. A single iteration of the code sequence may therefore be represented as multiplication of matrix T by the register vector. Accordingly, a shift in the code sequence by an offset N can be represented as multiplication of the register vector by the matrix $T^N$:

$$\begin{pmatrix} x_0(t+N) \\ x_1(t+N) \\ \vdots \\ x_{n-2}(t+N) \\ x_{n-1}(t+N) \end{pmatrix} = T^N \cdot \begin{pmatrix} x_0(t) \\ x_1(t) \\ \vdots \\ x_{n-2}(t) \\ x_{n-1}(t) \end{pmatrix}.$$

However, direct calculation of the N-th power of the matrix T would be even more complex than the prior art's known execution of N prior iterations for the shift register.

FIG. 1 illustrates the inventive procedure for calculating the state of the shift register after N prior iterations. The calculation is performed on the basis of a tap mask for the shift register, which in this case is shown in the form of external tap circuitry A for the shift register (and may also be in this form if appropriate) in order to illustrate the algorithm provided by the tap mask.

The tap circuitry A comprises n switches $S_0, S_1, \ldots, S_{n-2}, S_{n-1}$ which are connected to taps on the memory cells $R_0, R_1, \ldots, R_{n-2}, R_{n-1}$ with the same respective index. The switches $S_0, S_1, \ldots, S_{n-2}, S_{n-1}$ are respectively switched by switching or control signals $m_0, m_1, \ldots, m_{n-2}, m_{n-1}$, specifically such that the switch $S_i$ is closed when $m_i=1$ and is open when $m_i=0$, $i=0, 1, \ldots, n-1$.

The outputs 11, 12, 13 and 14 of the switches $S_0, S_1, \ldots, S_{n-2}, S_{n-1}$ are supplied to a modulo two adder 15. The output of the modulo two adder 15 is denoted by the reference symbol 16.

The shift register shall be in the initial state, and the intention is to calculate the state after N shift register operations. The tap mask, i.e. the positions of the switches $S_0, S_1, \ldots, S_{n-2}, S_{n-1}$, is defined by the polynomial division $m(x)=x^N/f(x) \bmod f$. In other words, $m(x)=[x^N]\bmod f$, with the division being executed in the polynomial ring over GF(2). In this case, the polynomial $m(x)$ has a degree of no more than $n-1$. Its coefficients $m_0, m_1, \ldots, m_{n-1}$ prescribe the control signals for the tap mask.

If the tap mask for N is known, only n shift register operations need to be executed in order to obtain the n values for the sought final state of the shift register after N shift register operations at the output 16.

The coefficients $m_0, m_1, \ldots, m_{n-1}$ are normally calculated using a processor. Since only n shift register operations need to be performed after the coefficients $m_0, m_1, \ldots, m_{n-1}$ have been determined, the computation operation performed by the tap circuitry A may also be performed using the processor. In this case, the entire "shift register arrangement" shown in FIG. 1 is implemented in the form of a program which allows the processor to execute the appropriate computation steps (first calculation of the coefficients $m_0, m_1, \ldots, m_{n-1}$, then performance of the n shift register operations).

One of the most important applications of the invention is the production of spreading sequences for CDMA transmission systems. This is explained below using an example.

Figure 2:
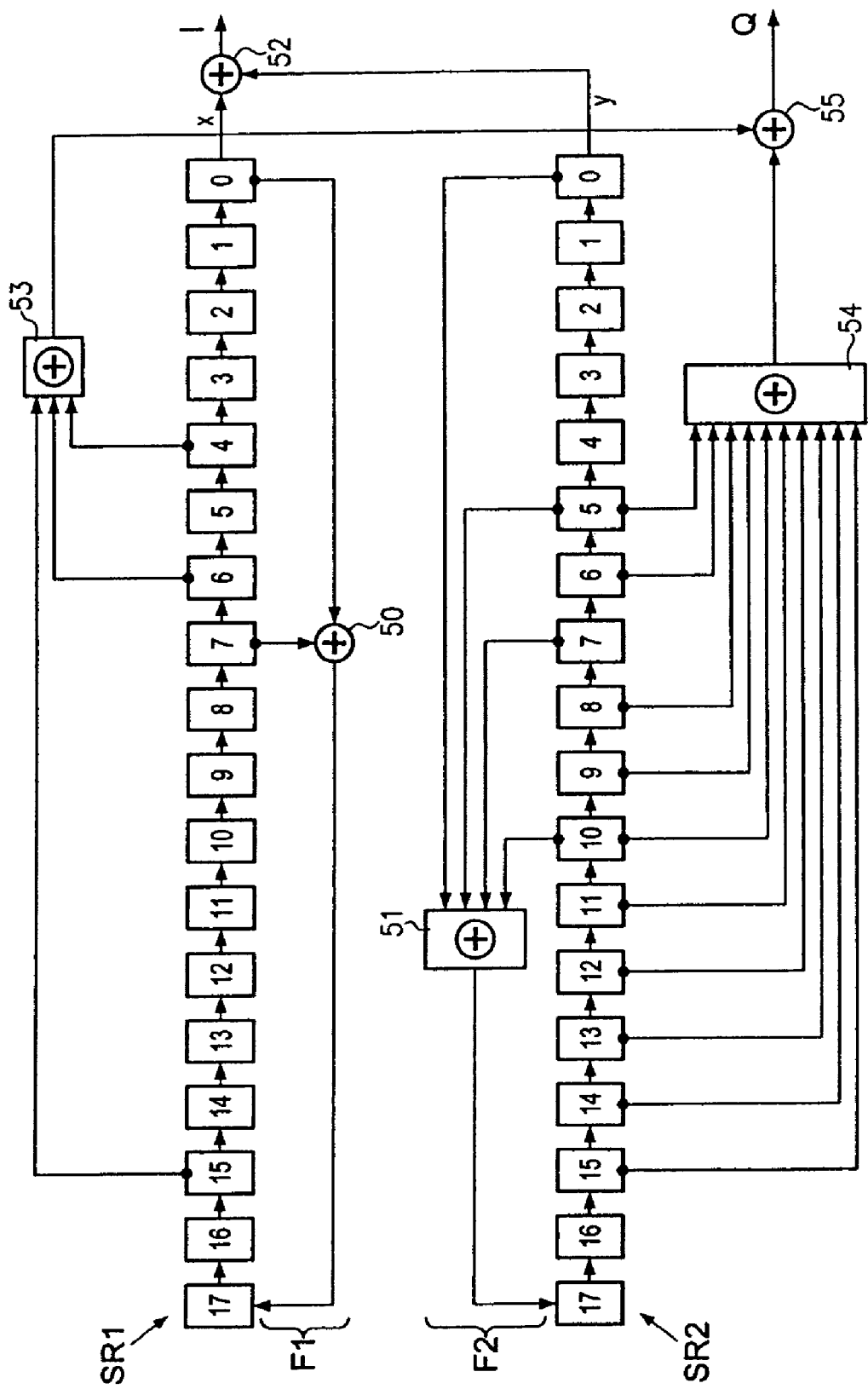
FIG. 2 shows a circuit diagram for a code generator, as is used in UMTS in order to generate the scrambling code in the downlink.

In UMTS, there are essentially three different types of scrambling codes which each comprise a sequence of complex numbers. The "long codes" comprise 38,400 numbers and have no repetitions within a time frame of 10 ms. Next to these, there are the "short codes", which are repeated every 256 characters, and the "preamble codes", which comprise 4096 characters. The long scrambling codes have the highest complexity. They are defined in the UMTS standard using pseudo noise sequences. FIG. 2 shows a spreading code generator such as is used in UMTS for generating long scrambling codes in the downlink. This spreading code generator is described in "3GPP: Spreading and modulation (FDD)", 3rd Generation Partnership Project TS 25.213 V4.2.0 (2001-12), in chapter 5.2.2.

The code generator comprises two shift registers SR1 and SR2. The shift register SR1 has permanent function circuitry F1 which is defined by the polynomial $f_1(x)=1+x^7+x^{18}$. The permanent function circuitry F2 in the second shift register SR2 is determined by the polynomial $f_2(x)=1+x^5+x^7+x^{10}+x^{18}$. Both polynomials are irreducible and of degree 18.

The function circuitry F1 in the first shift register SR1 is produced by taps on cells 0 and 7 (the shift register cells are indicated here merely by their indices) and an XOR gate 50 which adds the two taps on a modulo two basis. Similarly, the function circuitry F2 in the second shift register SR2 is produced by an XOR gate 51 which accepts the taps from the shift register cells 0, 5, 7 and 10 and adds them on a modulo two basis.

A further modulo two adder 52 adds the cell contents of the two shift register cells to the respective index 0. The output of the modulo two adder 52 outputs the real part (I) of the scrambling code.

To calculate the imaginary part (Q) of the complex scrambling code, a permanent mask tap is carried out. With respect to the first shift register SR1, this mask tap is produced by modulo two addition of the contents of the shift register cells with the indices 4, 6 and 15 using the modulo two adder 53. On the second shift register SR2, the shift register cells with the indices 5, 6, 8, 9, 10, 11, 12, 13, 14 and 15 are tapped and the cell contents are added on a modulo two basis, which is done by the modulo two adder 54. The outputs of the two modulo two adders 53 and 54 are added by a further modulo two adder 55. The output of the modulo two adder 55 forms the imaginary part (Q) of the complex-value scrambling code sequence which is sought.

In this case, the code generation takes place in the following manner:

The code sequence of the scrambling code with the number N is denoted by $z_N$. x and y denote the sequences which are output by the first shift register SR1 and by the second shift register SR2. $z_N(i)$ denotes the i-th symbol in the sequence $z_N$, and accordingly $x(i)$ and $y(i)$ denote the i-th symbols in the sequences x and y.

The sequence x is formed using the following initial values:

$$x(0)=1; x(1)=x(2)=\ldots=x(17)=0$$

The sequence y is formed using the following initial values:

$$y(0)=y(1)=\ldots=y(17)=1$$

The sequence $z_N(i)$, $i=0, \ldots, 2^{18}-2$, of the gold code with the number N is defined by:

$$z_N(i)=x((i+N)\bmod(2^{18}-1))+y(i)\bmod 2$$

This binary sequence is converted into a dual sequence $Z_N$:

$$Z_N(i) = \begin{cases} +1 & \text{when } z_N(i) = 0 \\ -1 & \text{when } z_N(i) = 1 \end{cases}$$

On the basis of this, the complex scrambling code $SC_N$ with the code number N is formed:

$$SC_N(i)=Z_N(i)+j\cdot Z_N((i+131072)\bmod(2^{18}-1)),$$

where $i=0, 1, \ldots, 38,399$ and j denotes the imaginary unit.

It is pointed out that the definition of the sequence $z_N(i)$ requires a shift through N bits starting from the initial state of the shift register SR1, which initial state is defined by the initial values. The invention makes it possible to use a computer to determine the content of the shift register SR1 which would be obtained after performing N iterations. This initialization state shifted through N bits can then be written into the register cells in the shift register SR1. Starting from this initialization state, the shift register SR1 then generates the pseudo noise sequence shifted through N bits, which then produces the spreading sequence $SC_N$ in conjunction with the pseudo noise sequence generated by the shift register SR2.

Another application involves calculating, for the two shift registers SR1 and SR2, initialization states which are each shifted through N bits as compared with the respective initial states. In this case, N is a desired time offset between the code generator and the timing of a transmission or reception activity.

Figure 3:
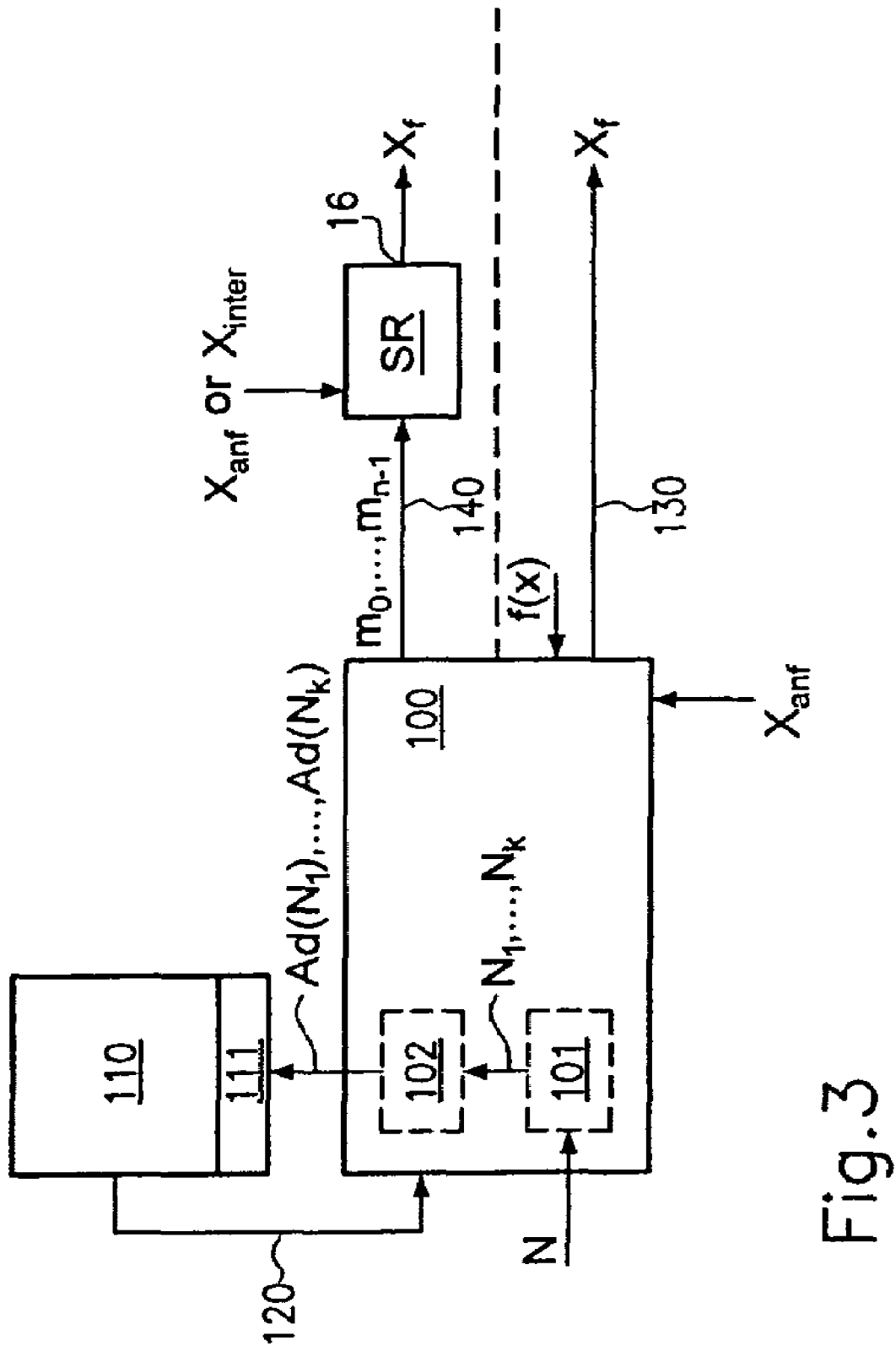
FIG. 3 shows a schematic illustration of two exemplary embodiments of the invention, which are shown in the same figure.

FIG. 3 shows a schematic illustration of two exemplary embodiments (illustrated in combination) of a device based on the invention which can be used to calculate, on the basis of an initial state, such a shift register state iterated through N bit shift operations or shift register operations. A common feature of the two exemplary embodiments is that the respective devices comprise a processor 100 and memory 110, preferably a ROM store. While the first exemplary embodiment, which is shown in the right-hand part of the image above the dashed line, additionally comprises a feedback shift register SR, there is no such shift register in the second exemplary embodiment, which is shown below the dashed line.

In both exemplary embodiments, the tap mask, which produces the desired N-fold iteration of a shift register arrangement with the characteristic polynomial f(x), is calculated using the processor 100 in interaction with the memory 110. To this end, the number N is input into the processor 100. The processor also knows the characteristic polynomial f(x).

The processor 100 now splits the number N into a sum $N=N_1+\ldots+N_k$. The split indicated by the box 101 is based on a prescribed splitting basis which contains the possible values $N_i$, i=1, 2, . . . ,.

The split $N_1, \ldots, N_k$ found for the number N is communicated to an address generator 102. The address generator 102 is normally likewise produced by means of program execution using the processor 100. The address generator 102 generates an address $Ad(N_1), \ldots, Ad(N_k)$ for each summand $N_1, \ldots, N_k$ of the split found for N, and this address actuates an address decoder 111 for the memory 110.

For all numbers $N_i$ of the splitting basis, the memory 110 stores the associated tap masks in the form of the corresponding coefficient sets $m_0, m_1, \ldots, m_{n-1}$. The coefficient sets for the numbers $N_1, \ldots, N_k$ of the split currently found are communicated to the processor 100 via the data line 120. In other words, the processor 100 reads the characteristic tap masks for the split $N_1, \ldots, N_k$ from the memory 110.

The calculation of the tap mask m(x) for the shift N is based on the following characteristic of the polynomial division:

$$x^{M_1+M_2}/f(x)=x^{M_1}/f(x)\cdot x^{M_2}/f(x)$$

where $M_1$ and $M_2$ are arbitrary whole numbers. The result is a polynomial of a degree no greater than 2(n−1).

Consequently, the tap mask sought with the characteristic polynomial m(x) is obtained by means of the following relationship:

$$m(x) = \prod_{i=1}^{k} m_i(x) \bmod f, \text{ where } m_i(x) = [x^{N_i}]\bmod f.$$

The addition of shifts is thus traced back to the multiplication of tap masks modulo f. When the text below refers to "multiplication of tap masks", this means multiplication of the characteristic polynomials of the tap masks.

This polynomial multiplication is carried out by the processor 100. The result obtained is the sought tap mask for the N-fold shift in the form of the coefficient set $m_0, m_1, \ldots, m_{n-1}$.

In the first exemplary embodiment, the coefficient set $m_0, m_1, \ldots, m_{n-1}$ is supplied to the shift register SR via a control connection 140. It is used to actuate the shift register SR, which, in line with the shift register shown in FIG. 1, is implemented with controllable tap circuitry A. The shift register SR has previously been assigned an initial state $X_{anf}$—for example the initial values defined for the shift register SR1. After n shift register operations, the output 16 of the tap circuitry A provides the desired values of the N-fold iterated final state $X_f$ (these then form the initialization state for the shift register SR1, for example; in this case, the shift register SR has the function circuitry determined by the characteristic polynomial $f_1(x)=1 +x^7+x^{18}$).

In the second exemplary embodiment, the generation of the values of the final state $X_f$ of the shift register arrangement by means of n shift register operations, which is performed in the shift register SR in the first exemplary embodiment, is executed in the processor 100. The values of the final state $X_f$ are provided at an output 130 on the processor 100. In this case, the processor 100 needs to be notified of the initial state $X_{anf}$ of the shift register arrangement.

It is pointed out that the shift associated with the tap mask (coefficient set $m_0, m_1, \ldots, m_{n-1}$) does not necessarily have to make up the entire shift N. It is also possible for the entire shift N to be split into two (or more) shift elements, e.g. N=(N−N')+N', where N' is a whole number less than N.

In this case, the first shift element N−N' can be carried out directly, e.g. by virtue of the shift register SR, in the first exemplary embodiment, or the processor 100, in the second exemplary embodiment, performing a number of N−N' shift register operations starting from the initial state $X_{anf}$ in order to generate the intermediate state $X_{inter}$ defined by the first shift element N−N'. Another option is for the intermediate state $X_{inter}$ brought about by N−N' shift register operations to have been stored in a memory, e.g. the memory 110, beforehand and to be read when required.

The tap mask to be calculated now needs to take into account only the remaining N' shifts (i.e. the second shift element). The formula is $$m(x)=[x^{N'}]\bmod f.$$

In the second step, this modified tap mask is then used to calculate the N-fold iterated final state $X_f$ of the shift register arrangement by carrying out n shift register operations starting from the intermediate state $X_{inter}$.

An important degree of freedom for the system described is the choice of splitting basis used. This degree of freedom allows a compromise between computation complexity and memory space requirement in accordance with the respective interests. The larger the number of (stored) tap masks for the splitting basis, generally the smaller the number k of masks required for a specific shift N. The only condition for a splitting basis is that any desired shift N can be achieved through sum formation.

A first splitting basis is provided, by way of example, by the values 20, 21, 22, . . . , i.e. Ni=2i−1, i=1, 2, . . . ,. Which of these tap masks need to be multiplied by one another in the method described above is then obtained from the binary representation of the desired shift N. The number k of necessary mask multiplications is in this case given the length of the shift represented as a binary number. Consequently, k is logarithmically dependent on N.

The group-by-group combination of bits in the binary representation of N allows further splitting bases to be defined. This will be illustrated using a few examples.

In UMTS, the shifts under consideration for producing the initialization state for a scrambling code are in the range between 0 and 65,535=$2^{16}$−1. In this respect, each shift N can be represented by a binary number having 16 digits:

$$N=b_{15}b_{14}b_{13} \ldots b_1b_0$$

In this case, $b_i$, i=0, . . . , 15 may each assume the value 0 or 1.

L denotes the number of bits which are combined in a group. By way of example, L=4 gives four groups, which are shown in table 1.

TABLE 1

| Group 1 | $b_{15}$ | $b_{14}$ | $b_{13}$ | $b_{12}$ | 0 | 0 | 0 | 0 | 0 | 0 | 0 | 0 | 0 | 0 | 0 | 0 |
|---|---|---|---|---|---|---|---|---|---|---|---|---|---|---|---|---|
| Group 2 | 0 | 0 | 0 | 0 | $b_{11}$ | $b_{10}$ | $b_9$ | $b_8$ | 0 | 0 | 0 | 0 | 0 | 0 | 0 | 0 |
| Group 3 | 0 | 0 | 0 | 0 | 0 | 0 | 0 | 0 | $b_7$ | $b_6$ | $b_5$ | $b_4$ | 0 | 0 | 0 | 0 |
| Group 4 | 0 | 0 | 0 | 0 | 0 | 0 | 0 | 0 | 0 | 0 | 0 | 0 | $b_3$ | $b_2$ | $b_1$ | $b_0$ |

In each group, there are thus 16 different numbers, i.e. there are a total of 4·16=64 tap masks to store in order to be able to calculate the associated tap mask for each shift N between 0 and 65,535 by means of polynomial multiplication. At most, 3 polynomial multiplications (of four polynomials) need to be performed. The total number of shift register operations is the n=18 shift register operations to be performed in the second step.

Table 2 shows further grouping options for the binary number representation for the example $0 \leq N \leq 65,535$. Each grouping option defines a splitting basis. The splitting basis example discussed above is shown under No. 1 in the first column of table 2

TABLE 2

| No. | Direct shift register operations N-N' | Group length L | Total number of shift register operations | Number of mask multiplications | Number of stored masks |
|---|---|---|---|---|---|
| 1 | 0 | 4 | 18 | 3 | 4 · 16 = 64 |
| 2 | 0 | 8 | 18 | 1 | 2 · 256 = 512 |
| 3 | 0-15 | 4 | $\leq 15 + 18$ | 2 | 3 · 16 = 48 |
| 4 | 0-15 | 6 | $\leq 15 + 18$ | 1 | 2 · 64 = 128 |
| 5 | 0-15 | 3 | $\leq 15 + 18$ | 3 | 4 · 8 = 32 |
| 6 | 0-15 | 2 | $\leq 15 + 18$ | 5 | 6 · 4 = 24 |
| 7 | 0-15 | 1 | $\leq 15 + 18$ | 11 | 12 · 1 = 12 |

The second column in table 2 shows any direct shift register operations to be carried out (in order to achieve the intermediate state $X_{inter}$), the third column shows the group length L, the fourth column shows the total number of shift register operations, the fifth column shows the number of mask or polynomial multiplications and the sixth column shows the number of tap masks to be stored in the memory 110 (represented by the coefficient sets associated with the tap masks).

If a group length of L=2 is chosen (splitting basis No 2), then only one mask multiplication needs to be performed.

However, there is a relatively high memory space requirement for the 512 tap masks of the splitting basis which are to be stored.

Example No 3 is oriented to example No 1 in terms of group length L, but shifts up to a maximum of N-N'=15, i.e. the shifts in the 4th group (with the lowest value), are not included in the calculation of the tap mask, but rather are implemented in another way, e.g. as direct shift register operations. In this respect, in comparison with example 1, a number of 16 stored tap masks no longer apply, and instead of 3 only two mask multiplications need to be carried out. The tap mask m(x) calculated in the process corresponds to a shift of N', where $0 \leq N-N' \leq 15$.

Example 3, in which the entire shift "hybrid" is produced by direct shift register operations and polynomial multiplications, for example, is normally more favorable than example 1, since 15 shift register operations can be implemented in software or hardware with (even) less complexity than a polynomial multiplication.

Examples 4 to 7 are modifications of the examples explained up to now and are geared, in particular, to instances of application with limited memory resources. The 4 least significant bits $b_0$, $b_1$, $b_2$, $b_3$ in the 4th group are produced, as in example 3, by direct shift register operations and L indicates the group length of the remaining groups (which cover the remaining 12 bits).

Example 7 with L=1 corresponds to the binary splitting basis while ignoring the 4 least significant bits in the 4th group. Only 12 tap masks need to be stored (namely one of each bit) in order to be able to deal with all shifts $0 \leq N \leq 65,535$ (hybrid). However, 11 polynomial multiplications are necessary in order to calculate the tap mask for N'-fold iteration of the shift register arrangement while taking into account $0 \leq N-N' \leq 15$ direct shift register operations.

The complexity for a mask multiplication is dependent on the implementation, which can be in hardware (i.e. in the form of a hardwired circuit) or in software. Software can be used to produce a mask multiplication for tap masks of length n using approximately 5·n elementary bit operations. In the example above (n=18), approximately 90 elementary bit operations would therefore need to be started for one mask multiplication.

Table 3 compares examples 4 and 5 with the methods known in the prior art (execution of shift register operations up until the desired shift N and reading of content patterns for the initialization of the shift register on the basis of N).

TABLE 3

| Method | Number of shift register or bit operations | Size of the memory used in bits |
|---|---|---|
| Execution of N shift register operations | 65,535 max | 0 |
| Reading of the initialization state from a table | 0 | 65,535 |
| Example No 4 | 33 shift register operations + 90 bit operations | 128 · 18 = 2304 |
| Example No 5 | 33 shift register operations + 270 bit operations | 32 · 18 = 576 |

It becomes clear that the variability of the inventive method with respect to the choice of splitting basis and of calculation of a "partial" tap mask for an N'-fold iteration with N'<N provides the option of keeping down the size of the memory 110 used, and also the number of computation operations required.

It should be noted that in all cases the calculation of the tap mask should then be followed by performance of the n=18 shift register operations which are to be executed in the second step.

Besides the splitting bases described above, which are based on the binary number representation, other splitting bases are possible. If comparatively fewer multiplications are to be performed, in order to reduce the computation complexity, or if there is a larger amount of available memory space, then it is possible to choose, by way of example, a splitting basis with the values 1, 2, 3, 8, 16, 24, 64, 128, 192, ..., i.e. $2^{i-1}$, $2 \cdot 2^{i-1}$, $3 \cdot 2^{i-1}$, $2^{i+2}$, $2 \cdot 2^{i+2}$, $3 \cdot 2^{i+2}$, ..., . In comparison with the binary basis, the number of mask multiplications is reduced to approximately half, and the size of the memory 110 required is tripled.

I claim:

1. A method for determining a final state, comprising n bits and iterated N times, for a shift register arrangement from a given initial state, comprising n bits, for the shift register arrangement, the iteration rule for the shift register arrangement being given by the characteristic polynomial $$f(x)=1+c_1 \cdot x + c_2 \cdot x^2 + \ldots + c_{n-1} \cdot x^{n-1} + x^n$$

with $c_1, c_2, \ldots, c_{n-1} \in \{0; 1\}$, where a shift register arrangement state change which corresponds to a number N' of shift register operations, where $0 < N' \leq N$, is calculated by:
  a) determining a tap mask which is characteristic of N' shift register operations; and
  b) performing n shift register operations, as a result of which the tap mask is used for each shift register operation to obtain one bit from n bits of an N'-fold iterated state of the shift register arrangement, wherein step a) comprises:
  splitting N' on the basis of $$N' = \sum_{j=1}^{k'} N_{i(j)};$$

and
determining the tap mask which is characteristic of N' shift register operations using k' tap masks $m_{i(j)}(x)$, where $j=1, \ldots, k'$, each of the k' tap masks $m_{i(j)}(x)$ being characteristic of the respective $N_{i(j)}$ shift register operations,
wherein the method is used in CDMA transmission systems in order to produce a spreading sequence with an offset of N bits.

2. The method as claimed in claim 1, wherein the tap mask is defined by the polynomial $$m(x) = [x^{N'}] \bmod f$$

in the form $$m(x) = m_0 + m_1 \cdot x + m_2 \cdot x^2 + \ldots + m_{n-1} \cdot x^{n-1}$$

with the coefficient set $m_0, m_1, \ldots, m_{n-1} \in \{0; 1\}$, wherein the i-th cell of the shift register arrangement is tapped off at the precise instant when $m_i = 1$, and
for each shift register operation a modulo two addition is performed for the bits which have been tapped off.

3. The method as claimed in claim 2, wherein step a) comprises
  a1) splitting N into a sum comprising k whole numbers $N_i$ in line with $$N = \sum_{i=1}^{k} N_i,$$

where k>1;
  a2) if N'=N, determining the tap mask which is characteristic of N shift register operations from the tap masks which are characteristic of the $N_i$, $i=1, \ldots, k$, shift register operations on the basis of $$m(x) = \prod_{i=1}^{k} m_i(x) \bmod f,$$

wherein $m_{i(x)} = [x^{N_i}] \bmod f$, and/or
  a2') if N'<N,
  choosing $N_{i(j)}$ for which $$N' = \sum_{j=1}^{k'} N_{i(j)} \text{ where } k' < k;$$

and
determining the tap mask which is characteristic of N' shift register operations from the tap masks which are characteristic of the $N_{i(j)}$, $j=1, \ldots, k'$, shift register operations on the basis of $$m(x) = \sum_{j=1}^{k'} m_{i(j)}(x) \bmod f, \text{ where } m_{i(j)}(x) = \lfloor x^{N_{i(j)}} \rfloor \bmod f.$$

4. The method as claimed in claim 3, wherein the split is based on a splitting basis in which $N_i$ can assume the values $2^{i-1}$, $i=1, 2, \ldots$.

5. The method as claimed in claim 3, wherein the split is based on a splitting basis in which $N_i$ can assume the values $2^{i-1}$, $2 \cdot 2^{i-1}$, $3 \cdot 2^{i-1}$, $2^{i+2}$, $2 \cdot 2^{i+2}$, $3 \cdot 2^{i+2}$, ..., $i=1, 2, \ldots$.

6. The method as claimed in claim 3, wherein N is represented as a binary number, and the associated bit word is split into groups of adjacent bits; and wherein the split for N is based on a splitting basis in which, for each group, $N_i$ can assume the values which are given by the binary numbers in which all bits apart from the bits in the group in question are 0.

7. The method as claimed in claim 3, wherein coefficient sets of the polynomials $m_{i(j)}(x)$ required for the possible values of $N_{i(j)}$ are stored in a memory, having the following step:
  reading the coefficient sets of the polynomials $m_{i(j)}(x)$ for the split $$N' = \sum_{j=1}^{k'} N_{i(j)}$$

from the memory.

8. The method as claimed in claim 1, wherein the final state, comprising n bits and iterated N times, is used as initialization state for generating a pseudo noise sequence shifted through N bits.

9. The method as claimed in claim 1, comprising the following step, which is to be performed after step b):
  c) writing the final state, comprising n bits and iterated N times, as initialization state into a shift register, comprising n shift register cells, with external function circuitry which is defined by the characteristic polynomial f(x).

10. The method as claimed in claim 9, wherein the shift register is also provided with tap circuitry which can be controlled by the tap mask, and wherein this tap mask is used, when step b) is performed, to produce the state comprising n bits and iterated N' times.

11. The method as claimed in claim 1, wherein the method is used in CDMA transmission systems using the transmission standards UMTS or IS-95.

12. The method as claimed in claim 11, wherein the method is used to produce the scrambling codes defined in the UMTS standard.

13. The method as claimed in claim 11, wherein a prescribed code number stipulates the offset for a spreading sequence, with the final state, comprising n bits and iterated N times, being used as initialization state for producing the spreading sequence associated with the code number N.

14. The method as claimed in claim 12, wherein a prescribed code number stipulates the offset for a spreading sequence, with the final state, comprising n bits and iterated N times, being used as initialization state for producing the spreading sequence associated with the code number N.

15. A device for producing a spreading sequence with an offset of N bits in a CDMA transmission system, the device configured to determine a final state, comprising n bits and iterated N times, for a shift register arrangement from a given initial state, comprising n bits, for the shift register arrangement, the iteration rule for the shift register arrangement being given by the characteristic polynomial $$f(x)=1+c_1 \cdot x + c_2 \cdot x^2 + \ldots + c_{n-1} \cdot x^{n-1} + x^n$$

with $c_1, c_2, \ldots, c_{n-1} \in \{0; 1\}$, the device comprising:
a means for determining a tap mask which is characteristic of N' shift register operations in this shift register arrangement, where N' is a whole number and $0 < N' \leq N$; and
a means for performing n shift register operations, as a result of which the tap mask is used for each shift register operation to obtain one bit from the n bits of an N'-fold iterated state of the shift register arrangement,
wherein the means for determining a tap mask which is characteristic of N' shift register operations comprises:
a means for calculating a split for N' on the basis of $$N' = \sum_{j=1}^{k'} N_{i(j)}$$

and
a means for determining the tap mask which is characteristic of N' shift register operations using k' tap masks $m_{i(j)}(x)$, where $j=1, \ldots, k'$, each of the k' tap masks $m_{i(j)}(x)$ being characteristic of the respective $N_{i(j)}$ shift register operations,
wherein the device is used in CDMA transmission systems in order to produce a spreading sequence with an offset of N bits.

16. The device as claimed in claim 15, wherein the tap mask is defined by the polynomial $$m(x)=[x^{N'}] \bmod f$$

in the form $$m(x)=m_0+m_1 \cdot x + m_2 \cdot x^2 + \ldots + m_{n-1} \cdot x^{n-1}$$

with the coefficient set $m_0, m_1, \ldots, m_{n-1} \in \{0; 1\}$, where the i-th cell of the shift register arrangement is tapped off at the precise instant when $m_i=1$, and for each shift register operation a modulo two addition is performed for the bits which have been tapped off.

17. The device as claimed in claim 16, wherein the device further comprises a memory, which stores the coefficient sets for a plurality of tap masks, which are characteristic of $N_i$ shift register operations, for the characteristic polynomials $m_i(x)$, where $m_i(x)=[x^{N_i}] \bmod f$.

18. The device as claimed in claim 17, wherein the means for determining a tap mask which is characteristic of N' shift register operations comprises:
a means for calculating a split for N into a sum comprising k whole numbers $$N = \sum_{i=1}^{k} N_i, \text{ where } k > 1,$$

a means for producing addresses for reading the coefficient sets for the characteristic polynomials $m_{i(j)}(x)$ of the split $$N' = \sum_{j=1}^{k'} N_{i(j)} \text{ where } k' < k \text{ if } N' < N.$$

19. The device as claimed in claim 17, wherein the device further comprises a further shift register, comprising n shift register cells, with external function circuitry defined by the characteristic polynomial f(x), into which the n-bit final state of the shift register arrangement is written as initialization state.

20. The device as claimed in claim 15, wherein the means for determining a tap mask which is characteristic of N' shift register operations in the shift register arrangement and the means for performing n shift register operations using the tap mask are produced in form of a processor.

21. The device as claimed in claim 15, wherein the means for determining a tap mask which is characteristic of N' shift register operations in the shift register arrangement is produced in the form of a processor, and wherein the means for performing n shift register operations using the tap mask is produced in the form of a shift register, comprising n shift register cells, with external function circuitry defined by the characteristic polynomial f(x) and tap circuitry which can be controlled by the calculated tap mask.

22. The device as claim in claim 15, wherein the CDMA transmission system is a CDMA transmission system in line with one of the transmission standards UMTS and IS-95.

23. The device as claimed in claim 22, wherein a prescribed code number N stipulates the offset for a spreading sequence, where the final state, comprising n bits and iterated N times, is used as initialization state for producing the spreading sequence associated with the code number N.

24. A method for determining a final state, comprising n bits and iterated N times, for a shift register arrangement from a given initial state, comprising n bits, for the shift register arrangement, the iteration rule for the shift register arrangement being given by the characteristic polynomial $$f(x)=1+c_1 \cdot x + c_2 \cdot x^2 + \ldots + c_{n-1} \cdot x^{n-1} + x^n$$

with $c_1, c_2, \ldots, c_{n-1} \in \{0; 1\}$, where a shift register arrangement state change which corresponds to a number N' of shift register operations, where $0 < N' \leq N$, is calculated by:
a) determining a tap mask which is characteristic of N' shift register operations;
b) performing n shift register operations, as a result of which the tap mask is used for each shift register operation to obtain one bit from n bits of an N'-fold iterated state of the shift register arrangement, wherein step a) comprises:

splitting N' on the basis of $$N' = \sum_{j=1}^{k'} N_{i(j)};$$

and determining the tap mask which is characteristic of N' shift register operations using k' tap masks $m_{i(j)}(x)$, where j=1, ..., k', each of the k' tap masks $m_{i(j)}(x)$ being characteristic of the respective $N_{i(j)}$ shift register operations; and c) producing the final state in the shift register, wherein the method is used in CDMA transmission systems in order to produce a spreading sequence with an offset of N bits.

* * * * *

UNITED STATES PATENT AND TRADEMARK OFFICE
CERTIFICATE OF CORRECTION

PATENT NO. : 7,426,528 B2 Page 1 of 1
APPLICATION NO. : 10/962789
DATED : September 16, 2008
INVENTOR(S) : Robert Denk It is certified that error appears in the above-identified patent and that said Letters Patent is hereby corrected as shown below:

In the Specification:

At column 2, line 54, "N=262 142" should read --N=262,142--

At column 9, line 61, "$f_1(x)=1+x^7+x^{18}$ The" should read --$f_1(x)=1+x^7+x^{18}$. The--

In the Claims:

At column 15, in Claim 3, line 56, "comprises" should read --comprises:--

At column 16, in Claim 9, line 60-61, "comprising the following step," should read --comprising,--

At column 17, in Claim 15, line 48, "K'" should read --k'--

Signed and Sealed this

Sixteenth Day of December, 2008

JON W. DUDAS
*Director of the United States Patent and Trademark Office*